June 19, 1956 V. BOUCARD ET AL 2,750,726

TRACTOR MOUNTED MOWER

Filed May 29, 1953 8 Sheets-Sheet 1

INVENTORS
Victor Boucard
Horace D. Hume

BY Greek Wells

Atty.

June 19, 1956 V. BOUCARD ET AL 2,750,726

TRACTOR MOUNTED MOWER

Filed May 29, 1953 8 Sheets-Sheet 2

INVENTOR.
Victor Boucard
Horace D. Hume
BY Greek Wells
Atty.

INVENTOR.
Victor Boucard
Horace D. Hume
BY
Greek Wells
Atty.

TRACTOR MOUNTED MOWER

Filed May 29, 1953 8 Sheets-Sheet 4

INVENTOR.
Horace D. Hume
Victor Boucard
BY
Greek Wells
Atty.

INVENTOR.
Victor Boucard
Horace D. Hume
BY
Greek Wells
atty.

INVENTORS
Victor Boucard
Horace D. Hume
BY
Greek Wells
atty.

INVENTORS
Victor Boucard
BY Horace D. Hume
Greek Wells
Atty.

June 19, 1956 V. BOUCARD ET AL 2,750,726

TRACTOR MOUNTED MOWER

Filed May 29, 1953 8 Sheets-Sheet 8

INVENTORS
Victor Boucard
Horace D. Hume
BY Greek Wells
atty.

United States Patent Office 2,750,726

Patented June 19, 1956

2,750,726

TRACTOR MOUNTED MOWER

Victor Boucard, Port-au-Prince, Haiti, and Horace D. Hume, Mendota, Ill.; said Boucard assignor to said Hume Application May 29, 1953, Serial No. 358,332

7 Claims. (Cl. 56—25)

The present invention relates to improvements in a tractor mounted mower.

It is the purpose of this invention to provide a mower that is carried by and is directly in front of the powered vehicle, which propels it over the field and furnishes the power to drive the mower, and a reel, where a reel is used; the construction being such that the mower is suspended by springs from the vehicle with freedom to rock about a longitudinal axis and to move up and down and follow the contour of the ground, regardless of the action of the vehicle in moving over rough ground.

The invention is embodied in a mower that may be suspended upon a crawler type tractor at the front thereof by a suitable attaching frame and gear and shaft connections to the power take-off of such tractors. It may also be mounted upon the round wheel type tractors adjacent to the large wheels of such tractors by a suitable attaching frame and gear and shaft connections to the power take-off. In the round wheel tractor mounting, the tractor is driven in reverse to the normal operation so that the large wheels are in front.

The invention comprises an attaching frame fixed to the power vehicle, a mower frame, having a cutter bar, sickle, and reel thereon with drive means for the sickle and reel on the mower frame, a first pivot means supports the mower frame on the attaching frame, for rocking movement about a central longitudinal axis, and a second pivot means mounts the mower frame for rocking movement about a transverse axis on the first pivot means. Counterbalance and stabilizer spring units extend from a rearward portion of the attaching frame forwardly to the mounting frame at a distance above the two pivot means to support the front end of the mower frame. Power is supplied from the power take-off of the tractor to an extensible shaft that is connected by a universal joint to a drive shaft at the rear of the mower frame. The drive shaft in turn is connected to the sickle and reel to drive them.

Shoes are provided at the front of the mower frame to ride on the ground and the counterbalance springs are arranged to cause the shoes to carry just sufficient weight to make the front end of the mower frame follow the ground contour. The pivotal mounting of the rear end of the mower frame on the attaching frame allows angular movement of the mower frame on both longitudinal and transverse axes with respect to the supporting vehicle and supports substantially all of the weight of the mower when the crop is being cut. The rise and fall and tilting of the front end of the vehicle in going over uneven ground can take place without lifting either end of the cutter bar, and without putting twisting strains on the frames. The front end of the mower frame is lifted up by a hand lever to clear obstacles. Crop gathering fingers and shields direct the cut crop beneath the tractor.

The detailed objects and advantages of the invention will appear more fully from the following description and the accompanying drawings illustrating a preferred form of the invention. The drawings and description are intended to be illustrative only are not intended to limit the invention except insofar as it is limited by the claims.

Figure 1:
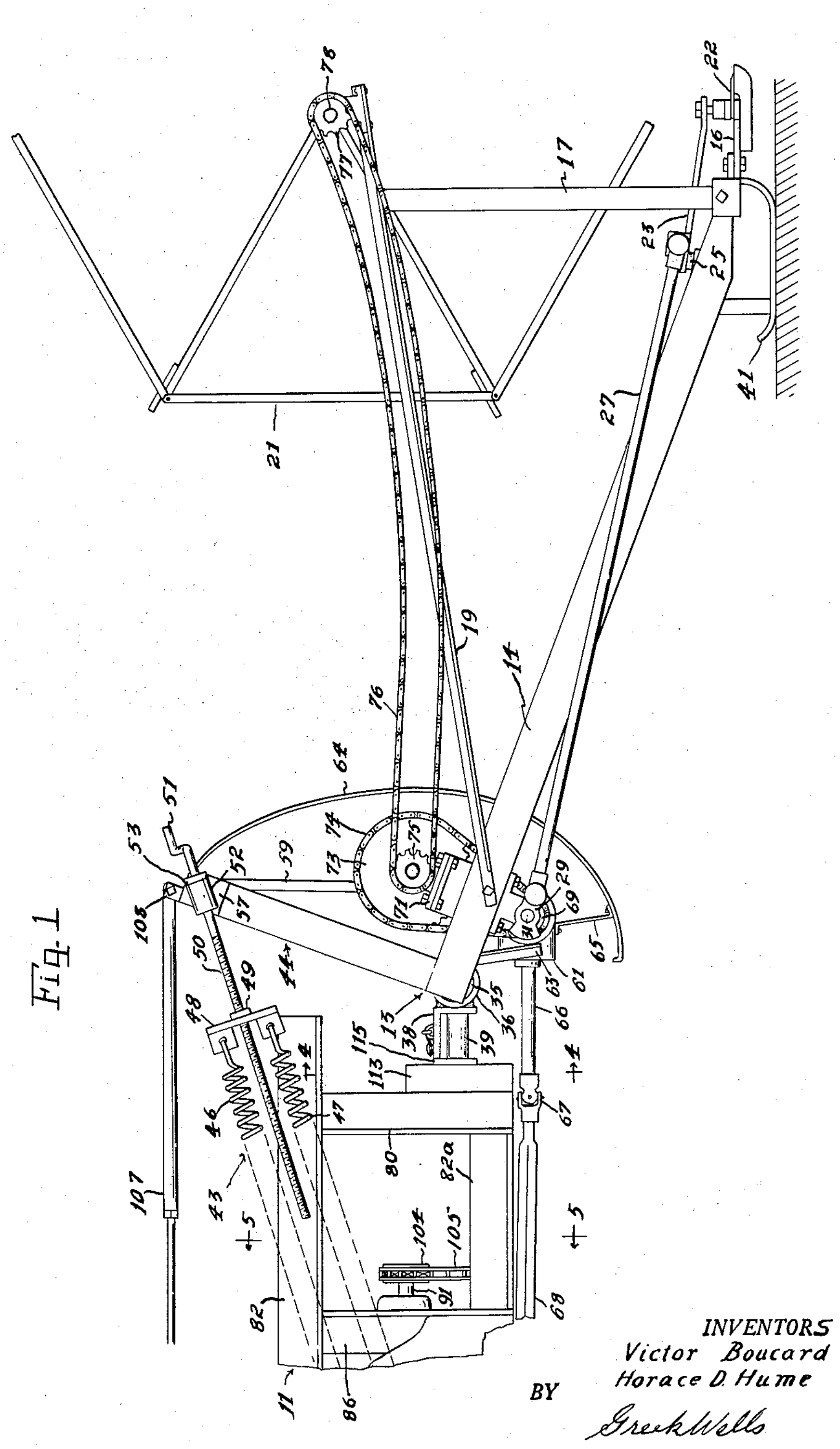
Figure 1 is a view in side elevation of the improved tractor mounted mower.
Figure 2:
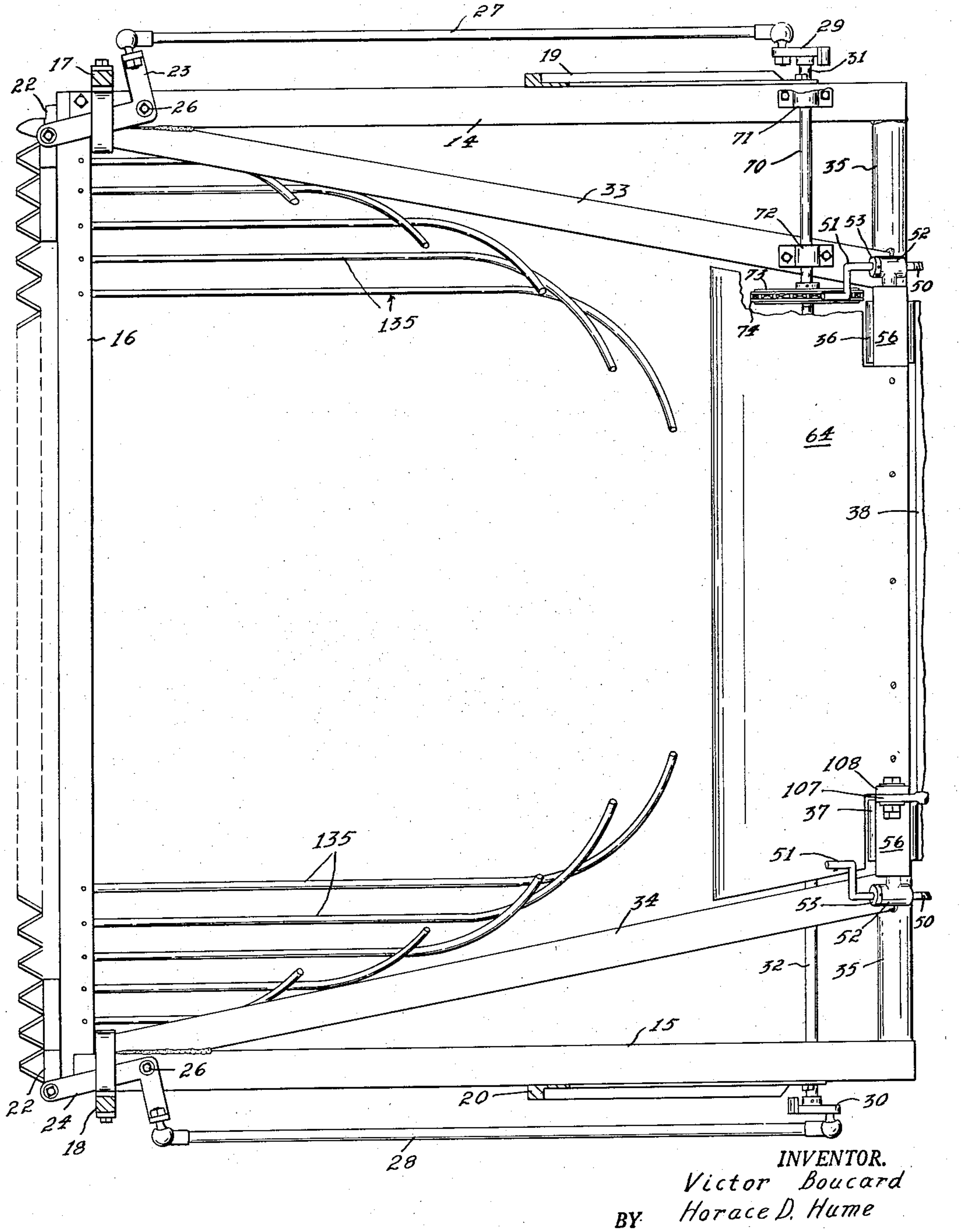
Figure 2 is a plan view with parts broken away of the mower with the reel removed.

Referring now in detail to the drawings and particularly to Figures 1 to 6, the mower is adapted to be mounted upon a powered vehicle which is identified by the numeral 10. An attaching frame 11, the details of which will be described later, is secured on the vehicle 10 and is provided with a cross beam 12 at the front. This cross beam is the supporting means for a mower frame identified by the numeral 13. The mower frame 13 has two forwardly extending arms 14 and 15 which mount a cutter bar 16 and supports 17 and 18. The supports 17 and 18 are connected to the side frames 14 and 15 by bars 19 and 20 which extend forwardly from the supports 17 and 18 and which mount a reel 21. A sickle 22 is mounted on the cutter bar and is reciprocated by two bell cranks 23 and 24 which are connected to the opposite ends of the sickle and which are pivoted by pivot pins 25 and 26 on the frame members 14 and 15. Links 27 and 28 are mounted on the bell cranks 23 and 24 and extend rearwardly to eccentrics 29 and 30 that are fixed on shafts 31 and 32. The arms 14 and 15 are braced by brace arms 33 and 34 which are connected to a tube 35 that connects the rear ends of the arms 14 and 15. The tube 35 is mounted in two bearings 36 and 37 that are secured upon a mounting bar 38. The mounting bar 38 is in turn supported on a shaft 39 which is journalled in a roller bearing 40 that is carried by the cross beam 12.

The bearings 36 and 37 provide pivot means about which the mower frame 13 can swing up and down. The shaft 39 and the bearing unit 40 provide a pivot means on which the mower frame can rock about an axis extending in the direction of travel of the vehicle 10. This combination of the two pivot means provides for freedom of movement of the mower frame with respect to the cross beam 12 which is fixed to the vehicle so that the front end of the mower frame may rise and fall to follow the ground contour and may rock from side to side with respect to the level of the vehicle 10 so that either the vehicle or mower frame may pass over abrupt bumps without putting a strain on the connections. The mower frame is provided with shoes 41 at the ends of the cutter bar to ride along the ground surface.

It is necessary to provide means for supporting the weight of the forward end of the mower frame and the mechanism carried thereby so that the mower frame will ride easily over uneven ground and so that it can be lifted quickly to clear obstructions. The attaching frame 11 has brackets 42 at the rear end thereof for mounting counterbalance spring means. This means comprises two spring units 43 that extend forwardly and upwardly to an upright frame unit 44 that is built up on the mower frame 13. The spring units 43 are alike. Each unit comprises a rear attaching member 45, two springs 46 and 47, a front yoke 48 that has a threaded sleeve 49, an adjusting screw 50 threaded into the sleeve 49 and having a handle 51 and a block 52 that is pivoted on the upright frame unit 44. The screw 50 is rotatably mounted in the block 52 and has a collar 53 thereon bearing on the block 52. By adjusting the screw 50, the spring unit 43 can be made to furnish the desired amount of counterbalance for the mower frame.

Figure 6:
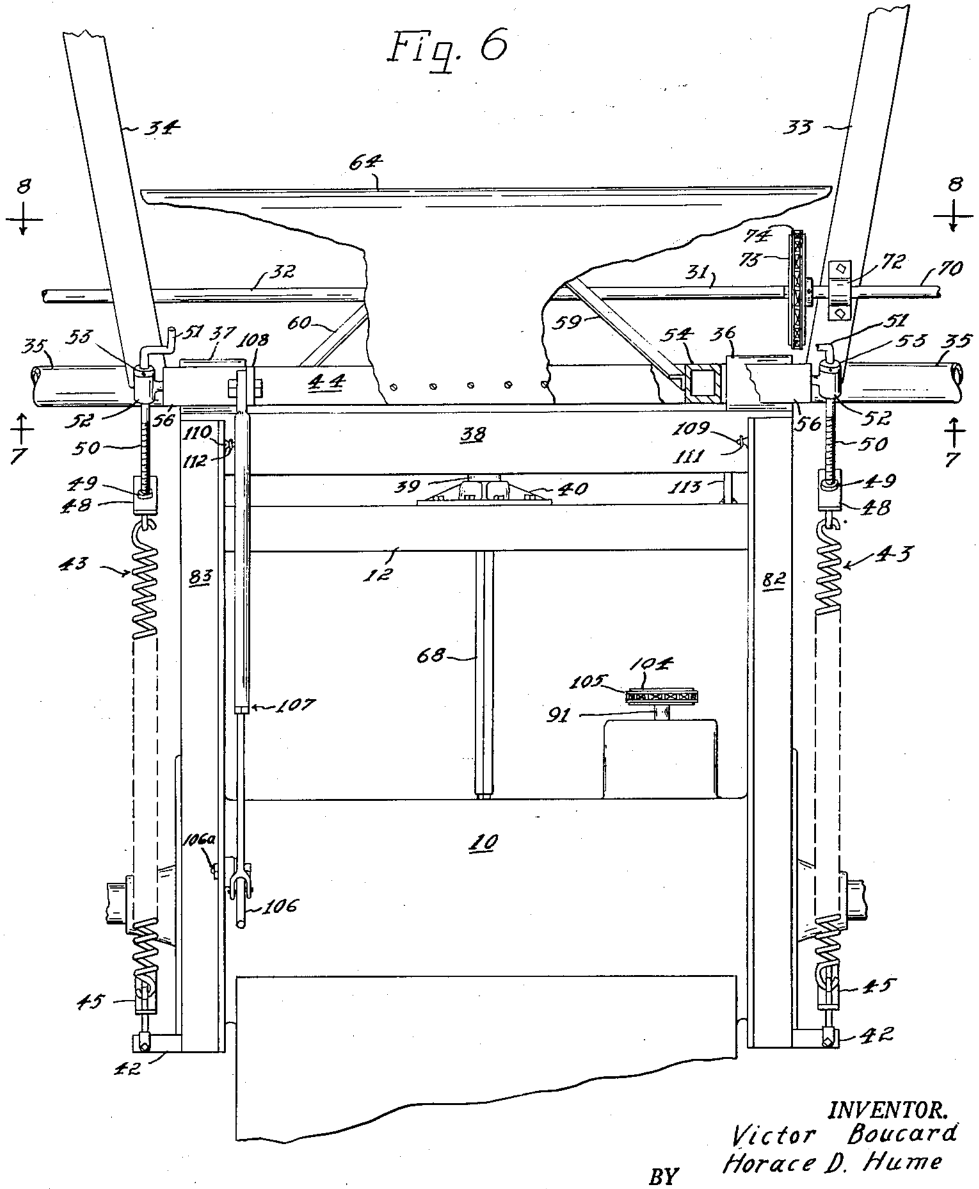
Figure 6 is a plan view with parts broken away showing the connecting mechanism between the mower frame and the vehicle attaching frame with the mower frame elevated for transport.
Figure 7:
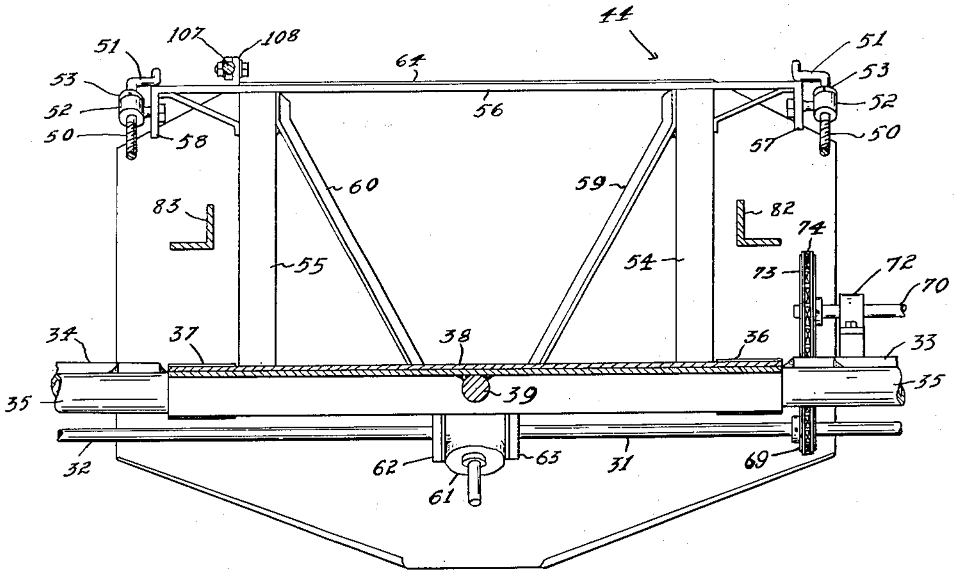
Figure 7 is a fragmentary sectional view on the line 7—7 of Figure 6.
Figure 8:
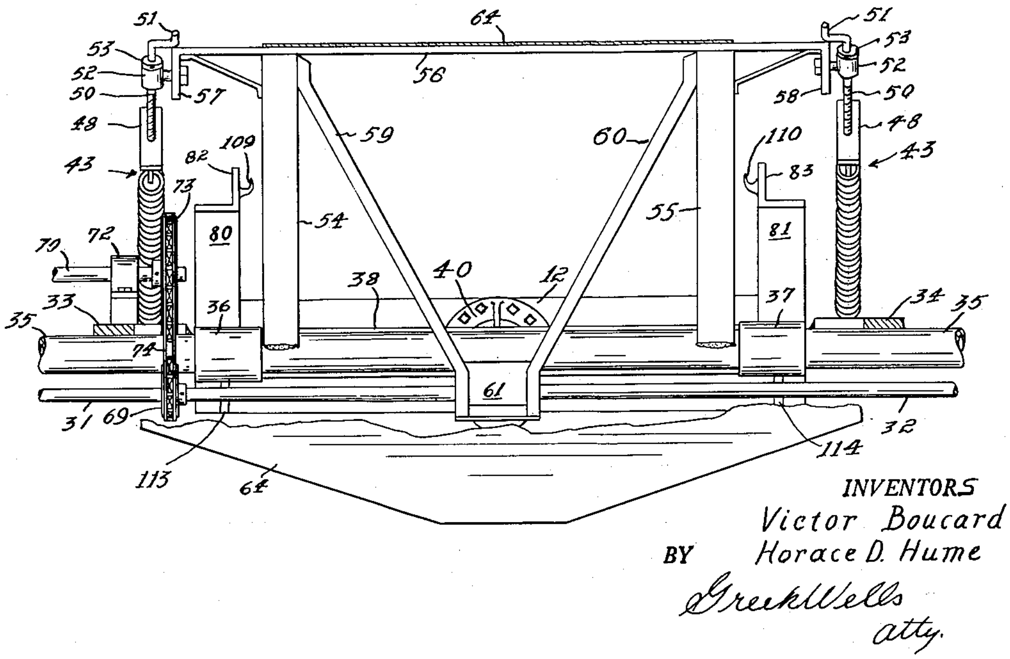
Figure 8 is a fragmentary sectional view on the line 8—8 of Figure 6.

The upright frame 44 is illustrated best in detail in Figures 6 and 8. It comprises two posts 54 and 55 which are fixed to the tube 35. The posts 54 and 55 have a cross bar 56 at the top which extends outwardly beyond the posts and which has depending portions 57 and 58 to which blocks 52 are pivoted. Two braces 59 and 60 are connected up at their upper ends to the posts 54 and 55 and extend downwardly and forwardly of the posts to a gear case 61. The gear case 61 is also secured to the tube 35 by two angle irons 62 and 63. The gear case 61 and the frame 44 and the drive mechanism carried thereby, are shielded from the crop by a sheet metal shield 64 which is secured to the top of the cross bar 56 and extends forwardly and downwardly from the cross bar 56 and then rearwardly beneath the gear case 61. A strap 65 secures the lower end of the sheet metal shield 64 to the gear case.

The gear case 61 mounts the cross shafts 31 and 32 that drive the eccentrics 29 and 30. Gearing (not shown) in the gear case 61 connects the shafts 31 and 32 to a drive shaft 66. The shaft 66 is connected by a universal joint 67 to an extensible shaft 68 which is driven from the power take off of the vehicle through a mechanism carried by the attaching frame 11.

The drive for the reel 21 is taken from the shaft 31. A sprocket wheel 69 is mounted on the shaft 31 inwardly of the brace 34. A short shaft 70 is mounted in suitable bearings 71 and 72 on top of the arm 14 and the brace arm 34. The short shaft 70 carries a sprocket wheel 73 which is connected to the sprocket wheel 69 by a chain 74. The shaft 70 at its outer end has a sprocket wheel 75 that is connected by a chain 76 to a sprocket 77 on the shaft 78 of the reel 21.

Figures 3, 9:
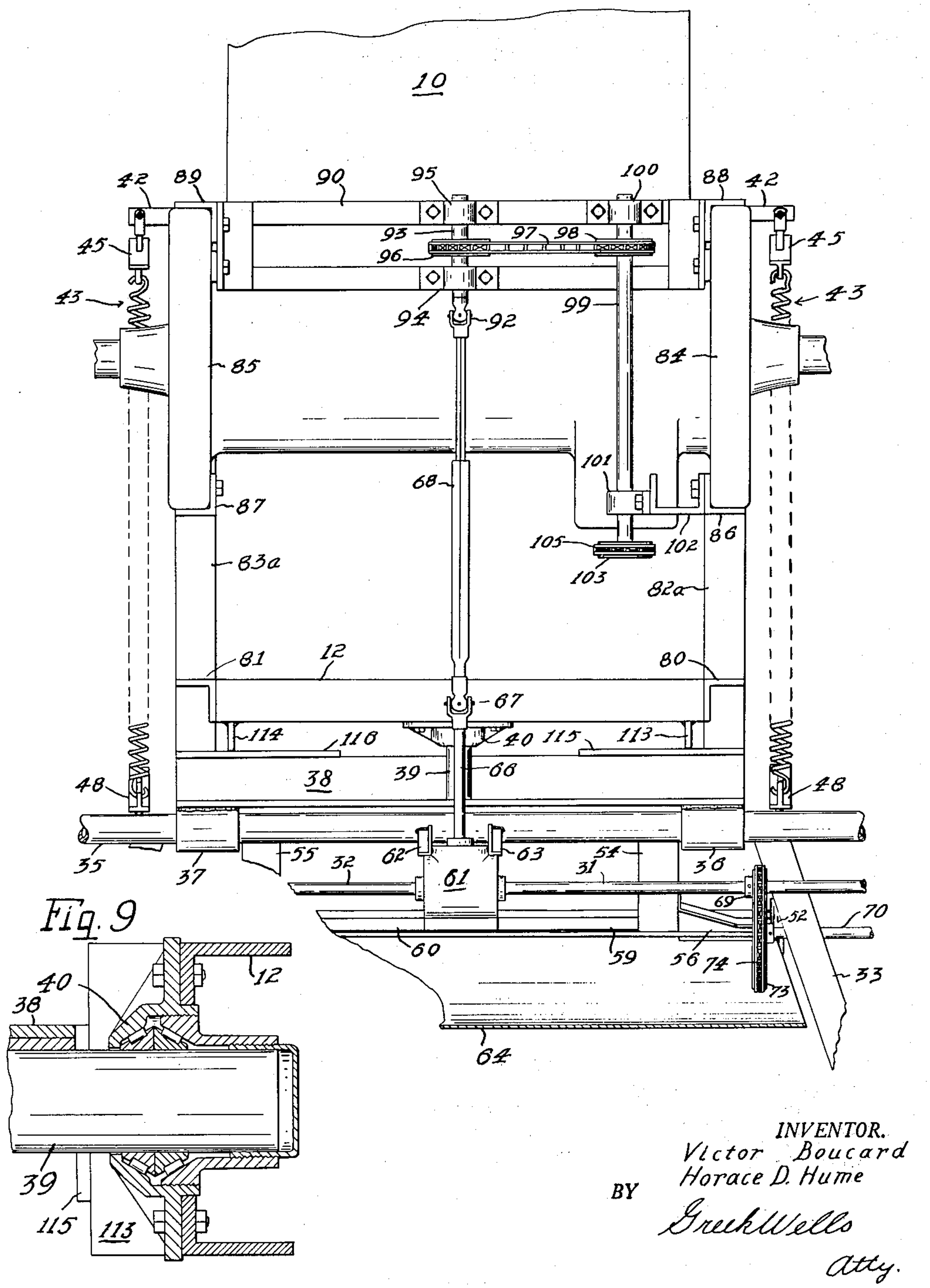
Figure 3 is a bottom plan view looking up at the rear portion of the mower frame and the attaching frame that mounts it to a round wheel tractor.
Figure 9 is an enlarged elevational view with parts broken away and shown in section of the longitudinal pivot means.

The attaching frame 11 is illustrated best in Figures 1, 3, 5, 6 and 7. These figures also illustrate the manner in which the shaft 68 is connected to the power take off of the tractor. The attaching frame 11 includes the front cross beam 12. Two uprights 80 and 81 are secured to the beam 12 at its ends and extend upwardly to two longitudinally extending bars 82 and 83. These bars project forwardly beyond the cross beam 12 and rearwardly over the wheel mounts 84 and 85 of the vehicle. The bars 82 and 83 have depending angle irons 86 and 87 which fit down over the front of the wheel mounts and similar angle irons 88 and 89 which extend down over the rear of the wheel mounts 84 and 85. Beneath the vehicle the rear angle irons 88 and 89 are connected by a cross frame 90 (see Figure 3) that serves to mount the shafting to connect the shaft 68 to a power take off shaft 91 of the vehicle. The cross frame 90 and the angle irons 86, 87, 88 and 89 are bolted to the wheel mounts 84 and 85 as illustrated in Figure 3. Bars **82*a* and 83*a* connect beam 12 to angle irons 86 and 87**.

The rear end of the shaft 68 is connected through a universal joint 92 to a shaft 93 that is journalled in bearings 94 and 95 on the cross frame 90. The shaft 93 carries a sprocket wheel 96 that is driven by a sprocket chain 97. The sprocket chain 97 is driven by a sprocket wheel 98 on a shaft 99. A rear bearing 100 for the shaft 99 is mounted on the cross frame 90 and a front bearing 101 for the shaft 99 is mounted on a bracket 102 that is bolted to the angle iron 86. A sprocket wheel 103 on the shaft 99 and a sprocket wheel 104 on the power take off shaft 91 are connected by a sprocket chain 105.

For manually lifting and lowering the front end of the mower frame a mower frame lifting mechanism is mounted on the attaching frame. A hand lever 106 is pivoted to the bar 83 by a pivot pin **106*a*. This hand lever is connected by an adjustable link 107 to an ear 108 on the top piece 56 of the frame 44. When the counterbalance units 43 are properly adjusted, there is very little weight on the shoes 41 of the mower frame and a light pull on the hand lever 106** will lift the mower frame.

Figure 4:
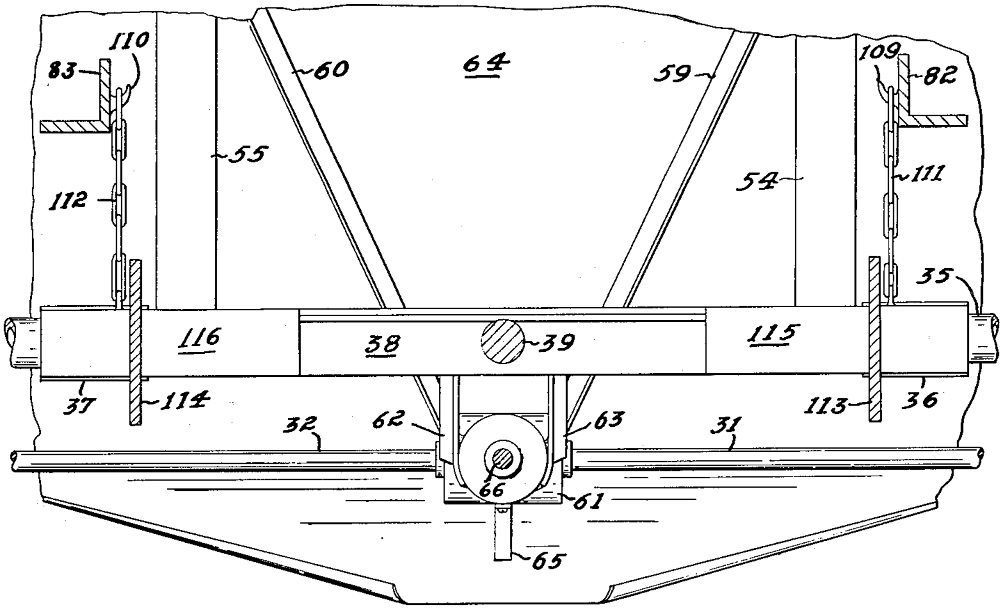
Figure 4 is a fragmentary enlarged sectional view taken on the line 4—4 of Figure 1, looking forward.
Figure 5:
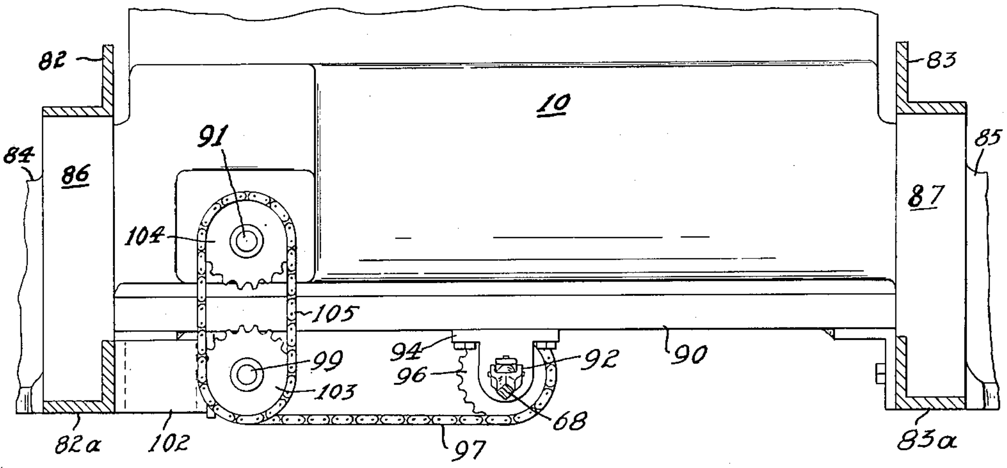
Figure 5 is a fragmentary enlarged sectional view taken on the line 5—5 of Figure 1.

The spring counterbalance units 43 exert a stabilizing force on the mower frame to oppose its tilting too much to one side or the other so that in the mowing operation the mower frame will not rock any more than is necessary to follow the contour of the ground. When the machine is being transported with the mower frame raised, it is desirable to hold the mower frame more firmly against rotating on the pivot provided by the shaft 39. To lock the mower frame against rotation, two hooks 109 and 110 are provided on the forwardly projecting ends of the bars 82 and 83. Chains 111 and 112 are fixed to the member 38 so that they can be hooked over the hooks 109 and 110 as illustrated in Figure 4, to prevent rocking of the mower frame on the bearing 40.

The bearing 40, as illustrated in Figure 9, is a roller bearing to provide for free rotation of the shaft 39. The end thrust of the mower, however, is taken by two upright bars 113 and 114 that are welded to the channel 12 and thrust plates 115 and 116 that are provided on the member 38.

Figure 10:
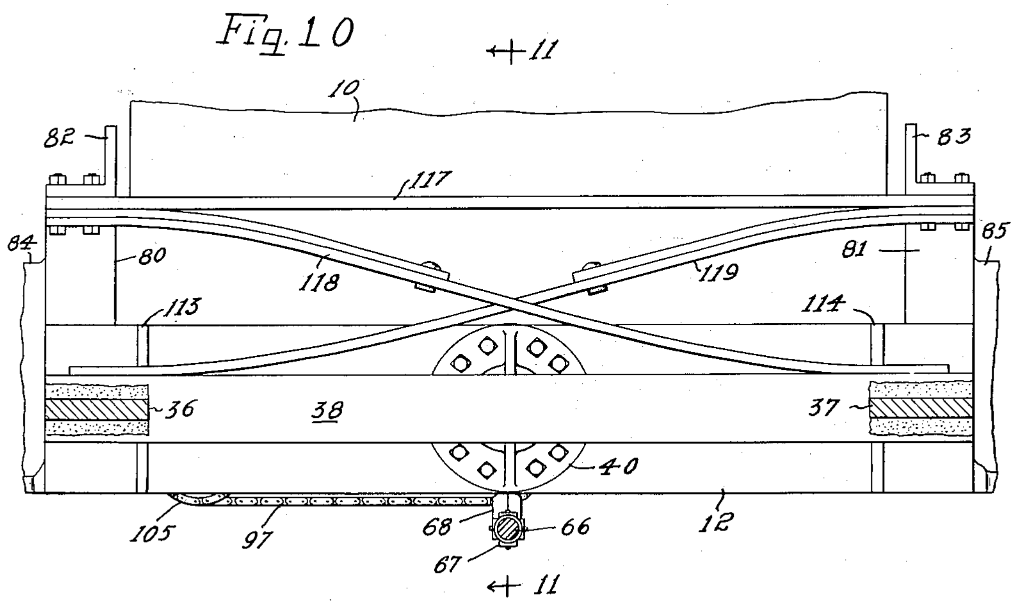
Figure 10 is a view similar to Figure 7, but illustrating a modified construction.
Figure 11:
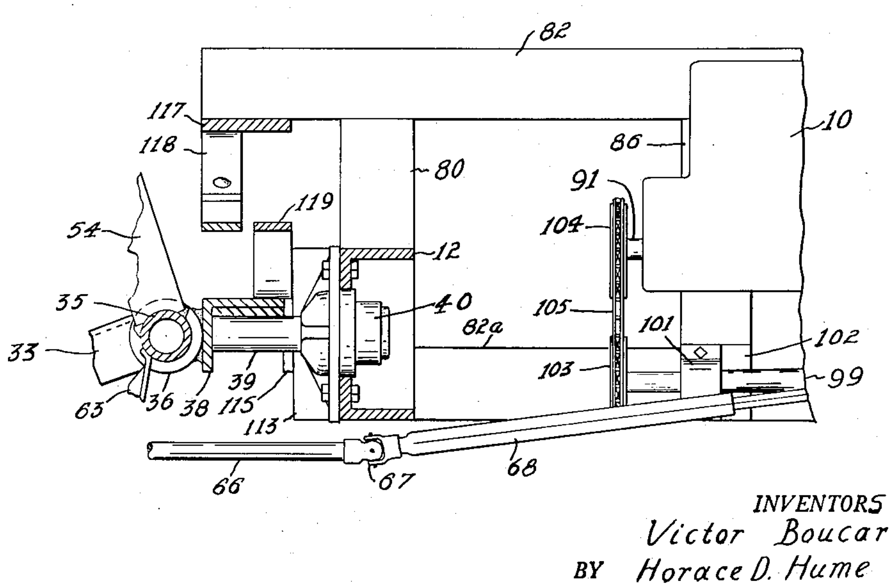
Figure 11 is a sectional view on the line 11—11 of Figure 10.

Referring now to Figures 10 and 11, these figures illustrate a modified construction wherein the rotation of the mower frame about the axis provided by the shaft 39 and the bearing unit 40 is dampened at all times. In this construction the front ends of the bars 82 and 83 are connected by a cross bar 117 and two leaf springs 118 and 119 are secured to the underside of the bar 117. These leaf springs extend across to bear on the top of the mounting bar 38. The springs oppose yieldingly any movement of the mower frame about the longitudinal axis.

Figure 12:
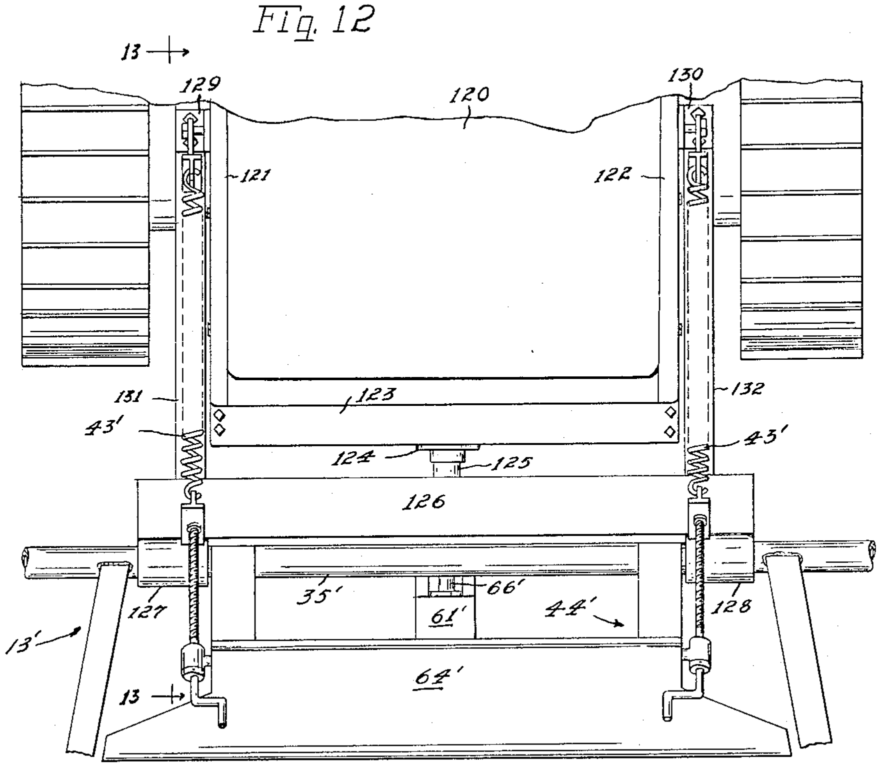
Figure 12 is a plan view similar to Figure 6, illustrating a modified construction as applied to a crawler type tractor.
Figure 13:
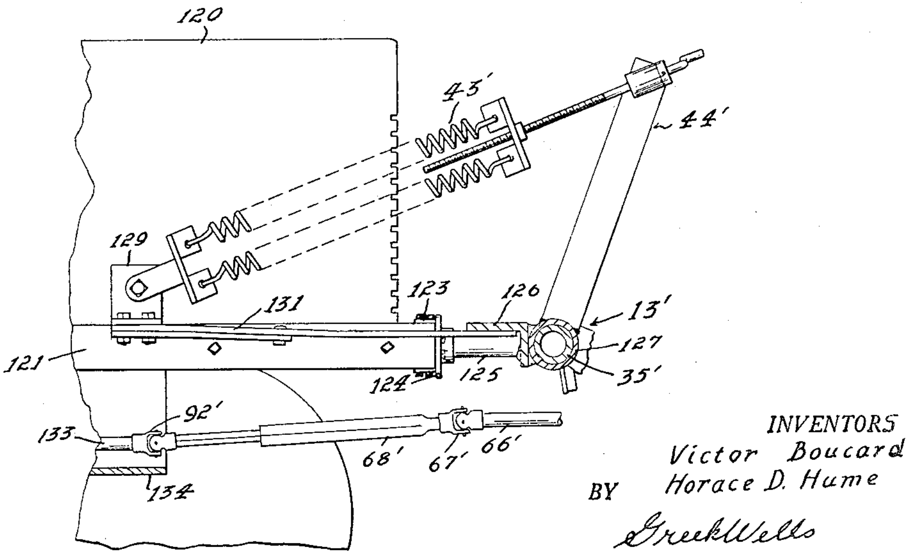
Figure 13 is a sectional view taken on the line 13—13 of Figure 12.

Figures 12 and 13 illustrate the mounting of the improved mower frame support on a crawler type tractor 120. An attaching frame comprises two side bars 121 and 122 bolted to the frame of the tractor 120 and a front beam 123 provides a support for a bearing 124. The bearing 124 rotatably mounts a shaft 125 that is fixed to a mounting bar 126. The mounting bar 126 carries bearings 127 and 128 for the tube 35′ of the mower frame 13′. The counterbalance spring units 43′ are connected to the upright frame 44′ of the mower frame in the same fashion as in the main form of the invention. The rear ends of these units 43′ are secured on brackets 129 and 130 that are mounted on the bars 121 and 122. In this form of the invention another means is shown for yieldingly opposing the rotation of the mower frame about the pivot point provided by the shaft 125 in the bearing 124. This means comprises two leaf springs 131 and 132 that are also secured by the brackets 129 and 130 and extend forwardly beneath the mounting bar 126.

The shaft 68′ in this form of the invention is connected by the universal joint 92′ to a shaft 133 that extends rearwardly beneath the crawler tractor 120 and connects to the power take off shaft at the rear end of the tractor. A housing 134 protects the shaft 133.

The spring means 118 and 119, shown in Figures 10 and 11, and the spring means 131 and 132 are not substitutes for the hooks 109 and 110 and the chains 111 and 112. The hooks and chains are used only in transportation whenever it is desired to prevent the mounting bar from rocking on its axis. The spring means 118 and 119 of Figures 10 and 11 and the spring means 131 and 132 of Figures 12 and 13 are damping devices that oppose rocking of the mounting bar on its pivot. The hooks and chains are not shown in Figures 10 to 13.

It is believed that the operation of the improved tractor mounted mower will be clear from the foregoing description. The bearings 36 and 37 mount the tube 35 so that the mower frame 13 can swing up and down on a transverse axis as it moves over the ground to accommodate for rise and fall of the sickle with respect to the power vehicle when the sickle is following the ground contour. The counterbalance spring units 43 counterbalance most of the weight of the mower frame 13 forward of the tube 35 to provide a substantially floating action for the cutter bar. When the slope of the ground over which the cutter bar shoes are running changes with respect to the ground on which the power vehicle is supported, the pivot provided by the shaft 39 on the bearing 40 allows the mower frame to rock on a longitudinal axis with respect to the attaching frame 11 so that there is no twisting or straining of either frame. This twisting movement will stretch one of the spring units 43 slightly more than the other so that they exert a limiting stabilizing force opposing rocking of the mower frame on a longitudinal axis. The end thrust of the mower frame against the attaching frame 11 necessary to push the mower frame ahead is of course, borne by the members 113 and 114 and the plates 115 and 116.

The crop as it is cut, falls back over the cutter bar and is pushed inward by guides 135 that extend rearwardly from the cutter bar and curl upwardly and inwardly at their free ends. The guides 135 move the cut crop out of the path of the tractor wheels so that the cut crop passes underneath the central portion of the tractor.

Having thus described our invention, we claim:

1. Means for mounting a mower upon a power driven vehicle comprising an attaching frame having means to secure it on the vehicle to project forwardly therefrom, a mower frame in front of said attaching frame, a transverse mounting bar at the front of said attaching frame and pivotally supported on the attaching frame for rocking movement about an axis that extends longitudinally of the attaching frame, the mower frame being pivoted at its rear end on the mounting bar to swing up and down, counterbalance spring means connected to said frames tending to lift the front end of the mower frame, means on the attaching frame and connected to the mower frame for lifting the front end of the mower frame clear of the ground for transport, and cooperating means on the attaching frame and mounting bar restricting pivotal movement of the mounting bar on the attaching frame.

2. Means for mounting a mower upon a power driven vehicle comprising an attaching frame having means to secure it on the vehicle to project forwardly therefrom, a mower frame in front of said attaching frame, a transverse mounting bar at the front of said attaching frame and pivotally supported on the attaching frame for rocking movement about an axis that extends longitudinally of the attaching frame, the mower frame being pivoted at its rear end on the mounting bar to swing up and down, said mower frame having an upright frame portion at its rear end, two counterbalance spring units, one mounted on each side of the attaching frame, each unit extending forward to the upright frame portion and pivotally attached thereto to counterbalance the weight of the mower frame forwardly of its pivotal mounting to said bar, and a hand lever on the attaching frame linked to said upright frame portion for lifting the front end of the mower frame.

3. Means for mounting a mower upon a power driven vehicle comprising an attaching frame having means to secure it in fixed position on the vehicle, to project forwardly therefrom, a mower frame in front of the attaching frame, said mower frame including a rear upright frame portion, a transverse mounting bar in front of said attaching frame, a pivot means on the attaching frame pivotally mounting the bar on the attaching frame for rocking movement on an axis that extends lengthwise of the attaching frame, another pivot means on the mounting bar pivotally mounting the mower frame on the bar to swing up and down, counterbalance springs extending from the upright frame portion rearwardly and secured to the attaching frame, said springs being under tension so as to oppose rocking movement of the mounting bar, and a mower frame lifting mechanism mounted on the attaching frame and connected to the mower frame.

4. The structure defined in claim 3 together with yielding members extending from the attaching frame to the ends of the mounting bar and opposing rocking movement of the bar on its pivot.

5. The structure defined in claim 3 together with two leaf springs, each having one end fixed to the attaching frame and the other end engaging the mounting bar to oppose its turning upon the first named pivot means.

6. The structure defined in claim 3 wherein the attaching frame has two forwardly extending portions one over each end of the mounting bar and each portion has a leaf spring secured thereto and bearing on the remote end of the bar to oppose rocking movement of the bar.

7. The structure defined in claim 3 wherein the first named named pivot means comprises a pin pivoted in the attaching frame and extending forwardly, the mounting bar being affixed to the pin, and wherein the mounting bar and the attaching frame have thrust bearing plates thereon spaced outwardly from the pin and engaging each other.

References Cited in the file of this patent

UNITED STATES PATENTS

| | | |
|---|---|---|
| 1,111,757 | Nilson | Sept. 29, 1914 |
| 1,241,452 | Unrein | Sept. 25, 1917 |
| 1,312,388 | Converse | Aug. 5, 1919 |
| 2,151,436 | Nicholas et al. | Mar. 21, 1939 |
| 2,340,488 | Paradise et al. | Feb. 1, 1944 |
| 2,375,848 | Hume | May 15, 1945 |
| 2,413,873 | Hume | Jan. 7, 1947 |
| 2,477,389 | Oehler et al. | July 26, 1949 |
| 2,510,245 | Munter | June 6, 1950 |
| 2,513,111 | Schiller | June 27, 1950 |
| 2,638,728 | Balzer et al. | May 19, 1953 |